Patented May 15, 1928.

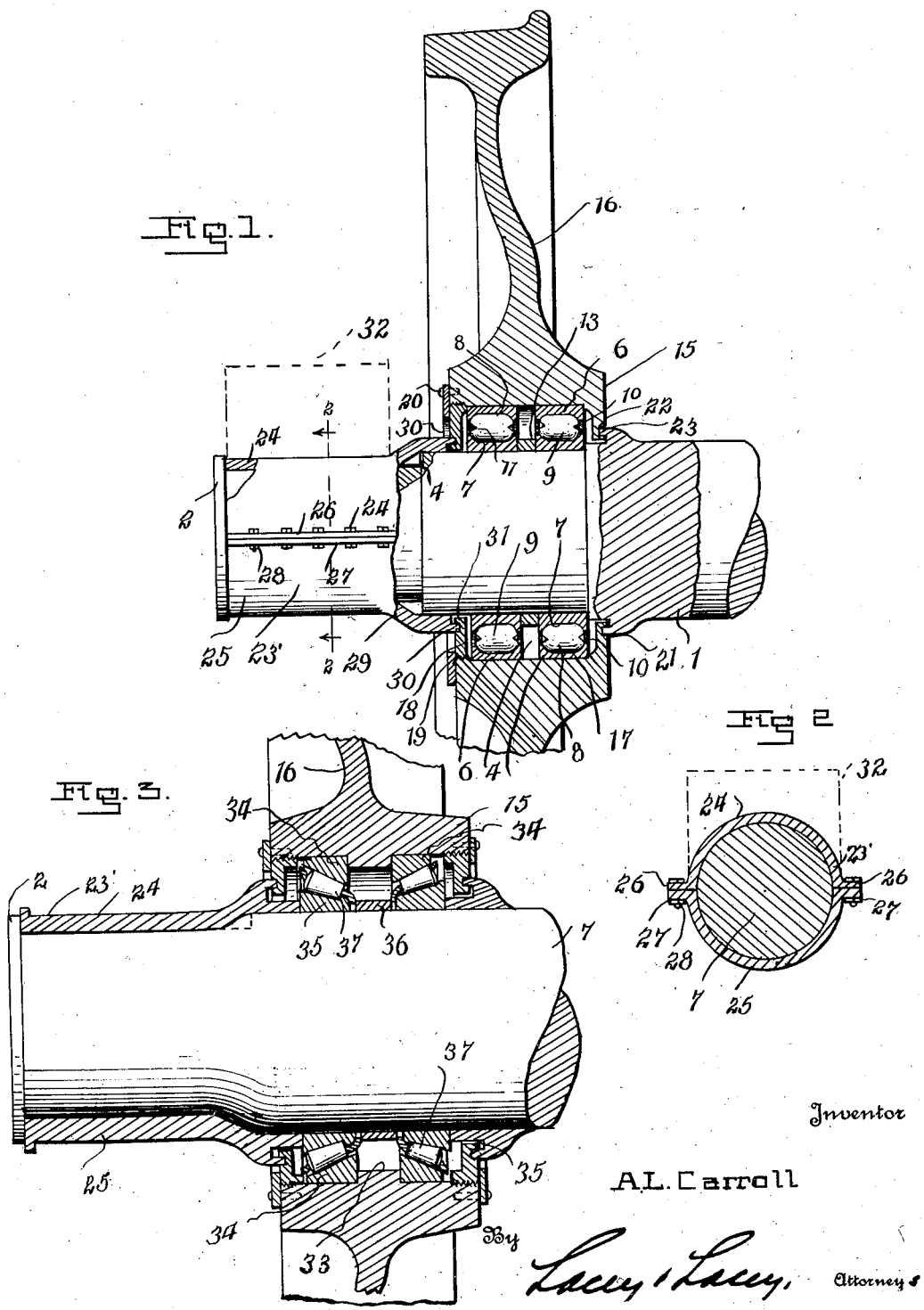

1,669,598

UNITED STATES PATENT OFFICE.

ANDREW L. CARROLL, OF ST. LOUIS, MISSOURI.

AXLE BEARING.

Application filed May 13, 1927. Serial No. 191,202.

The present invention is directed to improvements in axle bearings, more particularly designed for use in connection with railway cars.

The primary object of the invention is to provide a device of this character which is so constructed that the car wheels will be permitted to freely rotate thereon with minimum friction.

A further object of the invention is to provide a device of this kind so constructed that it can be easily and quickly placed in assembled relationship with the axle for maintaining the wheels thereon for free rotative movement.

Another object of the invention is to provide a bearing of this nature so constructed that the same can be filled with a suitable lubricant, and the lubricant will be retained therein for a considerable length of time in order to assure proper lubrication to all parts of the bearing.

In the accompanying drawing:

Figure 1 is a vertical sectional view through the bearing.

Figure 2 is a sectional view on line 2—2 of Figure 1.

Figure 3 is a sectional view showing a modified form of the invention.

Referring to the drawing, 1 designates the axle having its outer end provided with an annular flange 2, and spaced inwardly therefrom is a shoulder 3 provided with recesses 4, the purpose of which will be later explained.

Encircling the axle 1 is a pair of concentrically arranged race rings 5 and 6, the inner ring of each pair being intimately engaged with the axle. The confronting faces of the rings are provided with grooves 7 and 8 and in which the roller bearings 9 are engaged, said bearings being maintained in spaced relation by rings 10 carrying bosses 11 which engage in the recesses 12 formed in the ends of said bearings.

The race rings are held laterally spaced by a band 13 which encircles the axle 1, the space between said race rings providing a lubricant chamber 14.

The hub 15 of the flanged wheel 16 has the inner periphery of its bearing opening 17 engaged with the outer race rings 6, the said opening having a closure plate 18 threaded in its outer end, there being a ring 19 retained in place by a bolt 20 to prevent accidental displacement of said closure plate.

The hub is provided upon its inner end with an inturned flange 21 having an annular groove 22 formed in its outer face for the reception of the annular rib 23 formed upon the axle, the rib when thus engaged preventing leakage of lubricant from the bearing.

Upon the extended end of the axle 1 is engaged a sleeve 23' consisting of upper and lower sections 24 and 25, respectively, the side edges of which are provided with laterally extending flanges 26 and 27, respectively, clamping bolts 28 being engaged therewith to hold the flanges in clamped relation, endwise movement of the sleeve in an outward direction being limited by the flange 2. The inner ends of the sections 24 and 25 are formed to conform to the shape of the shoulder 3 and are provided with lugs 29 which engage the recesses 4 of the shoulder to prevent rotation of said sleeve.

The sections 24 and 25 are further provided with ribs 30 which engage in the annular groove 31 formed in the outer face of the closure plate 18, thus providing a joint to prevent leakage of lubricant from the bearing.

Since the axle 1 is engaged with the race rings 7 and the wall of the bearing opening of the wheel is engaged in the race rings 6 the wheel will be permitted to roll freely and without undue friction.

It will be observed that the plate 18 and flange 21 are spaced from the adjacent race ways in order to provide spaces to accommodate a suitable lubricant.

Upon the sleeve 23 may be mounted any well known type of pedestal 32, as indicated in dotted lines, said pedestal serving to support the car body, and if desired, the race ways of the respective rings may be so formed that ball bearings may be used in lieu of the roller bearings.

In Figure 3 the hub 15 is provided with an internal annular rib 33 which serves to maintain the outer rings 34 in spaced relation, the inner rings 35 being maintained in spaced relation by the band 36. The rings 34 and 35 support the roller bearings 37 of conventional form.

Having thus described the invention, I claim:

1. In combination with an axle, a wheel having its hub provided with a bearing opening, bearings in the opening between the hub and axle, the bearing opening having a plate threaded in its outer end and a flange at its inner end, the flange and plate having annular grooves therein, a sleeve engaged upon the axle, said sleeve and axle having ribs for engaging respectively, the grooves of the plate and flange, and a ring engaged with the hub and plate, as and for the purpose set forth.

2. In combination with an axle, a wheel having its hub provided with a bearing opening, bearings in the opening between the hub and axle, said axle having a shoulder provided with recesses, a sleeve consisting of upper and lower sections, each provided with a lug for interlocking engagement with the recesses, and a flange upon the outer end of the axle for engagement with the sleeve.

3. In combination with an axle, a wheel having its hub provided with a bearing opening, concentrically disposed race rings between the hub and axle, roller bearings engaged between the rings, a band encircling the axle and holding the race rings in spaced relation, said hub having an inturned flange upon its inner end, and having an annular groove formed therein, a plate engaged in the outer end of the bearing and having a groove formed therein, a sleeve engaged upon the axle and having ribs for engaging said groove of the plate, said axle having a rib carried thereby for engaging the groove of the flange, a ring detachably connected with the hub and engaged with the plate to prevent accidental displacement thereof.

In testimony whereof I affix my signature

ANDREW L. CARROLL. [L. S.]